THICKENED NITROPARAFFINS

Wesley A. Jordan, Minneapolis, Minn., assignor to General Mills, Inc.
No Drawing. Filed Dec. 23, 1969, Ser. No. 887,744
Int. Cl. C06b 7/00
U.S. Cl. 149—89                                8 Claims

ABSTRACT OF THE DISCLOSURE

A cyanoethyl ether of a galactomannan gum having a degree of substitution (D.S.) of greater than 1.9 is used to thicken nitroparaffins which are in turn used in explosives and rocket fuels.

---

This invention relates to galactomannan gums. More specifically, this invention relates to cyanoethyl ethers of galactomannan gums and their use as a thickener for nitroparaffins.

The nitroparaffins, especially nitromethane, are well known for their usefulness in rocket fuels and other explosives. The nitroparaffins are generally solutions and must be thickened prior to use. Various thickeners for explosive compositions have been tried previously. However, they are usually subject to certain disadvantages. For instance, nitrocellulose is used to thicken nitromethane, but nitrocellulose is very flammable and explosive. When nitrocellulose is used with nitromethane, high risk is involved because of the explosive properties of the mixture. Another advantage that cyanoethyl ethers of galactomannan gums enjoy over nitrocellulose is thickening efficiency. In general, it requires up to two times more nitrocellulose to obtain the same amount of thickening that is developed by the use of cyanoethyl ether of galactomannan gums. Likewise, the nitrostarch compounds possess many of the same disadvantages as nitrocellulose. These disadvantages can now be overcome by the use of a cyanoethyl ether of a galactomannan gum as a thickener for the nitroparaffins. The cyanoethyl ethers of galactomannan gums are not explosive and are not any more volatile than flour when mixed with nitroparaffins.

When practicing this invention, a cyanoethyl ether of a galactomannan gum having a D.S. of greater than 1.9, and preferably about 2.1 or more, is added in a concentration of about 2% or more to the nitroparaffin, thereby causing the nitroparaffin to thicken. By D.S. as used herein is meant the average substitution of cyanoethyl ether groups per anhydro sugar unit. Depending upon the nitroparaffin, the degree of substitution and concentration of the cyanoethyl ether of galactomannan gum in the nitroparaffin, the gel will vary from a very stiff gel, i.e. one that will support a tongue depressor in a vertical position when placed in a 100 ml. beaker which is half filled with the thickened nitroparaffin, to a weak gel, i.e. one that is a syrupy liquid. The variation in the degree of gellation will be further illustrated by the examples.

As disclosed above, the thickening is provided by a cyanoethyl ether of a galactomannan gum having a D.S. with cyanoethyl radicals of 1.9 or greater. The process for preparing the cyanoethyl ether of galactomannan gums useful within the scope of this invention is disclosed in the copending, commonly assigned application, filed of even date herewith entitled Cyanoethyl Ether of Galactomannan Gum, U.S. Ser. No. 887,745. The process and product disclosed in the above application is not a part of the inventive entity of this application. As disclosed in the above application, water, acrylonitrile, and the galactomannan gum are heated at reflux under alkaline conditions and periodically diluted with water to form a cyanoethyl ether of the galactomannan gum having a D.S. of greater than 1.9. The optimum D.S. is 2.0–2.7 but higher D.S.'s are possible. However, the very high D.S. products, 2.7–3.0, are generally unnecessary and uneconomical.

The compounds which can be thickened with the cyanoethyl ether of galactomannan gums are the liquid nitroparaffins which are derived from the aliphatic paraffin hydrocarbons which have one or more of the hydrogen atoms replaced with an $NO_2$ groups. Suitable liquid nitroparaffins include nitromethane, nitroethane, 1-nitropropane, 2-nitropropane, 2,2-dinitropropane, and other similar nitroparaffin products.

As indicated above, the specific degree of thickening of the nitroparaffin is dependent upon many factors including the D.S. of the cyanoethyl ether of the galactomannan gum, the nitroparaffin, and the concentration of the cyanoethyl ether of the galactomannan gum in the nitroparaffin. For instance, a 2% concentration of a 2.1 D.S. of cyanoethyl ether of guar in nitromethane will form a rigid gel whereas a 2% concentration of a 2.1 D.S. of cyanoethyl ether of guar in nitroethane will form a weak gel. The D.S. and concentration required to thicken a specific nitroparaffin is easily obtained by the use of conventional laboratory techniques. Generally, the cyanoethyl ether must be present in a minimum concentration of 0.5% of the nitroparaffin.

Thickened nitroparaffins are especially useful in the explosive field. Generally, explosives are comprised of an inorganic oxidizer such as a nitrate, e.g., alkali metal nitrate, alkaline earth nitrates, a liquid such as a nitroparaffin, a thickening agent, and a sensitizing explosive such as trinitrotoluene. By using cyanoethyl ethers of galactomannan gums as disclosed herein, the liquid nitroparaffin is readily thickened to give the explosive composition the proper gel consistency.

Cyanoethyl guar dissolved in nitroparaffin is a desirable coating or film forming agent. A film deposited from a solution of 2.8 D.S. cyanoethyl ether of guar in nitroparaffin and dried is water proof and practically mar proof.

The following examples will further illustrate the embodiments of this invention but are not intended to limit the scope thereof.

EXAMPLE I

A cyanoethyl ether of guar was prepared as disclosed in the above-referenced patent application. The D.S. was 2.8 and was determined as follows:

The percent N in the adduct was determined by the Kjeldahl method. Likewise, the percent N was determined in the guar. From these data, the increase in N of the adduct over the gum was calculated which value is used to calculate the number of cyanoethyl groups present per sugar unit. A 2% concentration of the 2.8 D.S. cyanoethyl ether of guar was mixed with nitromethane by adding 2.0 grams of the substituted guar to 98.0 grams of the nitromethane solution. The mixture was stirred and the viscosity was determined to be 11,000 cps. The viscosity was determined at 25° C. using a Brookfield RVF viscometer, #4 spindle, rotating at 10 r.p.m.

EXAMPLE II

A film of the sol from Example I was deposited on a glass plate using a .005" doctor blade, and air dried overnight. The dried film was scratched with a hard object (knife) and found to be very resistant to mar. The dried film was half immersed in cold tap water. Two weeks later, the immersed part showed no softening or whitening. This film may be good for furniture finishing.

EXAMPLE III

Example I was repeated with a cyanoethyl ether of guar having a D.S. of 2.8 and a concentration of 4% in the nitromethane. A very rigid gel was obtained.

EXAMPLE IV

A 2.1 D.S. of cyanoethyl ether of guar was prepared as disclosed in Example I and was mixed in a concentration of 2% in nitromethane. Viscosity, determined as in Example I, was 10,000 cps.

EXAMPLE V

Various samples of cyanoethyl ether of guar were prepared as in Example I. The samples were then mixed with the various nitroparaffin solvents as disclosed in Table I and the resultant thickened solutions were observed. The results are reported in Table I below:

TABLE I

| Thickener | D.S. | Percent thickener | Nitroparaffin | Gel | Viscosity determined as in Ex. I, cps. |
|---|---|---|---|---|---|
| Cyanoethyl ether of guar | 2.1 | 2.0 | Nitroethane | Weak | 140 |
| Do | 2.1 | 2.0 | Nitromethane | Rigid | |
| Do | 2.1 | 2.0 | 1-nitropropane | None | |
| Do | 3.0 | 2.05 | do | Weak | |
| Do | 3.0 | 5.30 | do | Strong | 6,800 |
| Do | 2.1 | 2.0 | 2-nitropropane | None | |

EXAMPLE VI

Example I was repeated using a cyanoethyl ether of galactomannan having a D.S. of 3.0 The viscosity was determined as in Example I. The results are as follows:

TABLE II

| D.S. | Percent | Nitroparaffin | Gel viscosity, cps. |
|---|---|---|---|
| 3.0 | 2.0 | Nitromethane | 1,600 |
| 3.0 | 3.0 | do | 8,500 |

EXAMPLE VII

A cyanoethyl ether of locust bean gum was prepared as disclosed in the above referenced patent application. The cyanoethyl ether of locust bean gum had a D.S. of 1.98. Example V was repeated and a rigid gel was formed in nitromethane.

As can be seen from the data above, cyanoethyl ether of galactomannan gums having a D.S. greater than 1.9 can be successfully used to thicken nitroparaffins. This is especially advantageous since many of the conventional nitroparaffin thickeners result in dangerous mixtures. The nitroparaffins as thickened can be readily used in conventional explsoives. Other uses and advantages of the cyanoethyl ethers of galactomannan gums for use as thickeners in the nitroparaffins will be readily apparent to those skilled in the art.

The embodiments of the invention in which an exclusive property or privilege is claimed are defined as follows:

1. A thickened nitroparaffin mixture comprising a normally liquid nitroparaffin and a cyanoethyl ether of galactomannan gum having a D.S. of greater than 1.9, said cyanoethyl ether of galactomannan being present in a concentration sufficient to thicken the nitroparaffin.

2. A product as in claim 1 wherein the concentration of the cyanoethyl ether of galactomannan gum is at least 0.5% of the nitroparaffin.

3. A product as in claim 1 wherein the D.S. of the cyanoethyl ether of the galactomannan gum is 2.0-3.0.

4. A product as in claim 1 wherein the galactomannan gum is guar gum.

5. A product as in claim 1 wherein the galactomannan gum is locust bean gum.

6. A product as in claim 1 wherein the nitroparaffin is nitromethane.

7. A process of thickening nitroparaffin solutions comprising mixing the nitroparaffin with a cyanoethyl ether of galactomannan gum having a D.S. of greater than 1.9, said cyanoethyl ether of galactomannan gum present in the concentration sufficient to thicken the nitroparaffin.

8. A process as in claim 1 wherein the concentration of the cyanoethyl ether of galactomannan gum is at least 0.5% of the nitroparaffin.

References Cited
UNITED STATES PATENTS

| | | | |
|---|---|---|---|
| 2,891,852 | 6/1959 | Schaad | 149—89 |
| 2,921,846 | 1/1960 | Novak | 149—91 |
| 3,035,948 | 5/1962 | Fox | 149—19 |
| 3,035,950 | 5/1962 | Long | 149—89 X |
| 3,356,544 | 12/1967 | Fee et al. | 149—89 X |
| 3,383,252 | 5/1968 | Jones | 149—18 |
| 3,470,042 | 9/1969 | Grelechi | 44—7 B X |

BENJAMIN R. PADGETT, Primary Examiner

U.S. Cl. X.R.

44—7 B; 106—162; 149—18